(12) United States Patent
Jensfelt

(10) Patent No.: US 6,330,430 B1
(45) Date of Patent: Dec. 11, 2001

(54) CASE FOR MOBILE TERMINAL

(75) Inventor: Henrik Jensfelt, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/359,994

(22) Filed: Jul. 22, 1999

Related U.S. Application Data

(60) Provisional application No. 60/124,872, filed on Mar. 17, 1999.

(51) Int. Cl.[7] .............................. H04B 1/034; H04B 1/08; H04B 1/38; A45F 5/00; B65D 85/38
(52) U.S. Cl. .......................... 455/90; 455/347; 455/100; 455/575; 224/250; 224/236; 224/930; 206/305
(58) Field of Search .................................. 455/550, 575, 455/454, 455, 90, 347, 351, 100; 206/305, 320; 150/165, 154; 224/250, 674, 235, 236, 930; D3/218; 235/380

(56) References Cited

U.S. PATENT DOCUMENTS

| | | | |
|---|---|---|---|
| 4,420,104 | 12/1983 | Dilenno | 224/250 |
| 4,573,573 | * 3/1986 | Favaro | 206/305 |
| 4,966,321 | * 10/1990 | Outlaw | 224/253 |
| 5,535,928 | 7/1996 | Herring | 224/250 |
| 5,653,336 | * 8/1997 | Buonaiuto et al. | 206/320 |
| 5,667,466 | * 9/1997 | Riley, Jr. | 482/105 |
| 5,957,357 | * 9/1999 | Kallman | 224/675 |
| 6,076,789 | * 7/1998 | Jackson | 248/205.2 |

* cited by examiner

Primary Examiner—Daniel Hunter
Assistant Examiner—Meless Zewdu
(74) Attorney, Agent, or Firm—Jenkens & Gilchrist, P.C.

(57) ABSTRACT

A flexible sheet has a plurality of fasteners which can be fastened together to form an open-cornered enclosure for a mobile terminal, such as a wireless phone. A mid-portion of the flexible sheet has a selectively adjustable length whereby the case can be made larger or smaller to accommodate a variety of differently-sized instruments.

16 Claims, 3 Drawing Sheets

CASE FOR MOBILE TERMINAL

CROSS-REFERENCE TO RELATED APPLICATION

This application for patent claims the benefit of priority from, and hereby incorporates by reference the entire disclosure of, co-pending U.S. Provisional Application for Patent Serial No. 60/124,872, filed Mar. 17, 1999.

BACKGROUND OF THE INVENTION

1. Technical Field

This invention relates generally to a case for a mobile terminal, and more particularly to such a case that is formed of a flexible material adaptable for use with a variety of differently sized mobile terminals.

2. Background Art

Generally, protective cases for mobile terminals such as cellular telephones and the like, are specifically constructed for use with a designated instrument having a fixed size and shape. Other protective cases for mobile terminals have limited adjustability provided through the use of elastic materials integrated into the case construction. However, such elastically deformable cases have only limited flexibility, are difficult to adjust to differently sized instruments, and provide only limited shape conformity.

The present invention is directed to overcoming the problems set forth above. It is desirable to have a protective case for a mobile terminal, such as a cellular telephone, that can be easily adjusted to accommodate a variety of differently sized portable instruments. It is also desirable to have such a case that can be unfolded to a flat structure when not used to enclose and protectively support a portable instrument.

SUMMARY OF THE INVENTION

In accordance with one aspect of the present invention, a case for a mobile terminal includes a sheet of flexible material and a plurality of fasteners attached to the sheet of flexible material. At least one of the plurality of fasteners is arranged to fasten to another one of the fasteners whereby the sheet of flexible material is formed to enclose at least a portion of the mobile terminal.

Other features of the case for a mobile terminal embodying the present invention include the sheet of flexible material being a single sheet, or alternatively, a plurality of sheet sections attached together. Still another feature includes the sheet of flexible material being a substantially flat sheet. Yet another feature includes the sheet of flexible material being a high density neoprene material, leather, or textile fabric.

Still additional features of the case for a mobile terminal embodying the present invention include the plurality of fasteners being complemental press-type fasteners, complemental hook and loop-type fasteners, or button-type fasteners. An additional feature of the case includes the flexible material being foldable to substantially conform to portions of the external surfaces of a mobile terminal, which in a preferred embodiment comprises a wireless phone.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF A PRESENTLY PREFERRED EXEMPLARY EMBODIMENT

Figures 1, 2, 3:
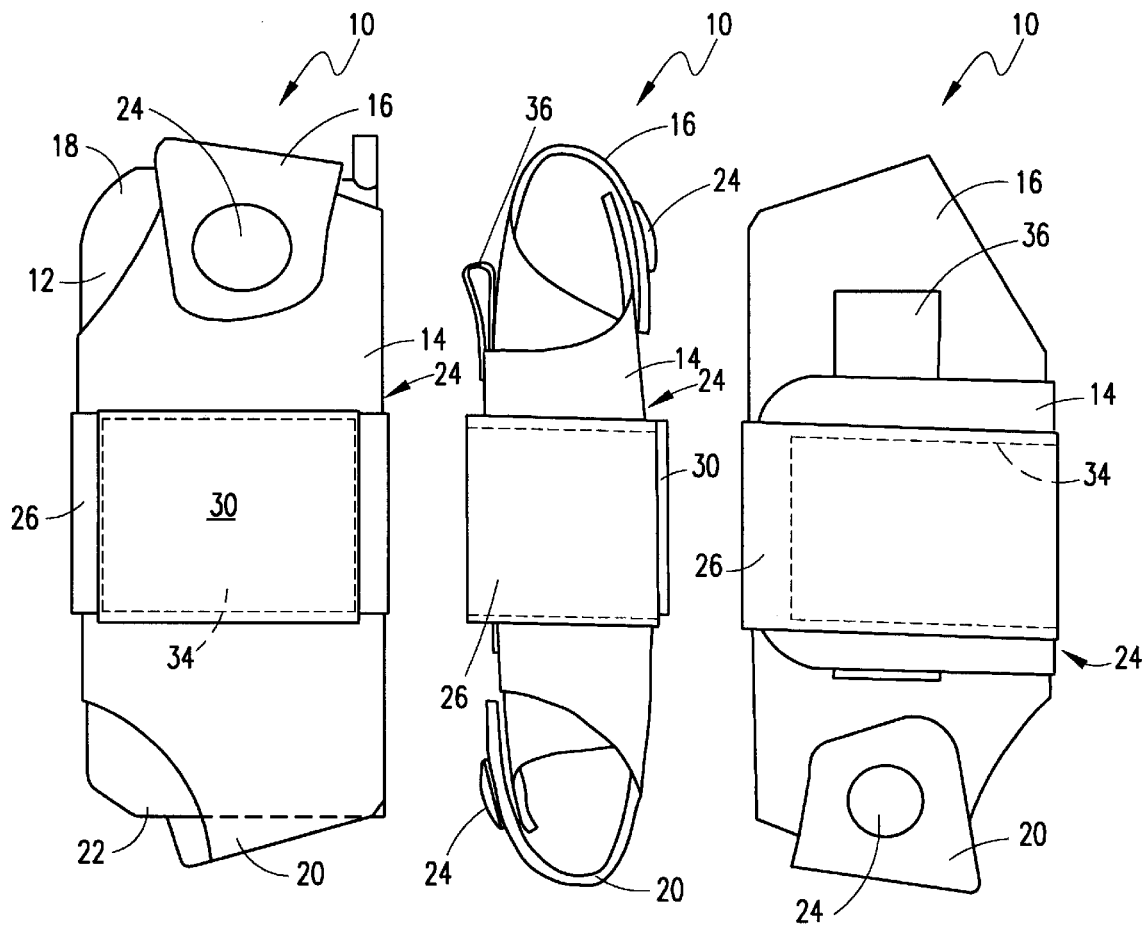
FIG. 1 is a front view of the case for a mobile terminal, in accordance with the present invention, showing a portable phone enclosed within the case.
FIG. 2 is a side view of the case for a mobile terminal, in accordance with the present invention.
FIG. 3 is a rear view of the case for a mobile terminal, embodying the present invention.

In the preferred embodiment of the present invention, which is illustrated in FIGS. 1–4, a case 10 for a mobile terminal 12. In the interest of clarity in illustrating the folded structure of the flexible case 10, the mobile terminal 12, which the exemplary embodiment is a wireless phone, is shown enclosed in the case 10 in FIG. 1, but omitted from FIGS. 2 and 3. The case 10 is formed of a flexible sheet 14 that has a top portion 16 adapted to cover a top portion 18 of the mobile terminal 12 when the sheet 14 is folded, a bottom portion 20 adapted to cover a bottom portion 22 of the mobile terminal 12 when the flexible sheet 14 is folded, and a mid-portion 24 disposed between the top portion 16 and bottom portion 20 of the flexible sheet 14 and adapted to protectively enclose, or wrap around, the mid-portion of the mobile terminal 12 when the flexible sheet 14 is in its folded position. As will be understood in more detail in the following description, the mid-portion 24 of the flexible sheet 14 has a selectively adjustable length so as to shorten or lengthen the girth of the case 10 and thereby accommodate a variety of variably-sized mobile terminals 12. Advantageously, the case 10 embodying the present invention provides an open-cornered enclosure for portable terminals, thereby further increasing the size and shape range capability of the case 10.

In the exemplary preferred embodiment, the case 10 for a mobile terminal 12 also includes a plurality of fasteners 24 that are attached to the sheet 14. At least one of the fasteners 24 is arranged so as to fasten, or connect, to a second one of the plurality of fasteners 24 whereby the sheet of flexible material 14 is formed to enclose at least a portion of the mobile terminal 12. In the illustrated embodiment, a first pair of fasteners 24 are arranged in the top portion 16 so that when the flexible sheet 14 is folded, the fasteners 24 in the top portion 16 cooperate to secure portions of the top portion 16 together and form a cover over the top portion 18 of the mobile terminal 12. Similarly, a second set of fasteners 24 are arranged in the bottom portion 20 of the flexible sheet 14 so that when the flexible sheet 14 is folded, the fasteners 24 in the bottom portion 20 secure portions of the bottom portion 20 together to form a cover over the bottom portion 22 of the mobile terminal 12. The manner in which the fasteners 24 cooperate to form respective covers over the top portion 18 and bottom portion 22 of the mobile terminal 12 is best illustrated in FIGS. 1–3. In the illustrated embodiment, the fasteners 24 are press-type, or snap, fasteners having respective male and female portions which engage by pressing the male and female portions together. Alternatively, the fasteners 24 could be hook and loop-type fasteners, such as those sold under the trademark Velcro® or button-type fasteners where one of the members is a button and the second member of the pair is a buttonhole adapted to receive the button.

The sheet 14 of flexible material may comprise a single sheet of material or, as illustrated in the drawings, have a separately preformed mid-portion strap 26 which has one end attached to the flexible sheet 14, or the sheet 14 may comprise a plurality of sheet sections attached, such as by stitching or adhesives, together to form the unitary single sheet structure 14 of the case 10.

Figure 4:
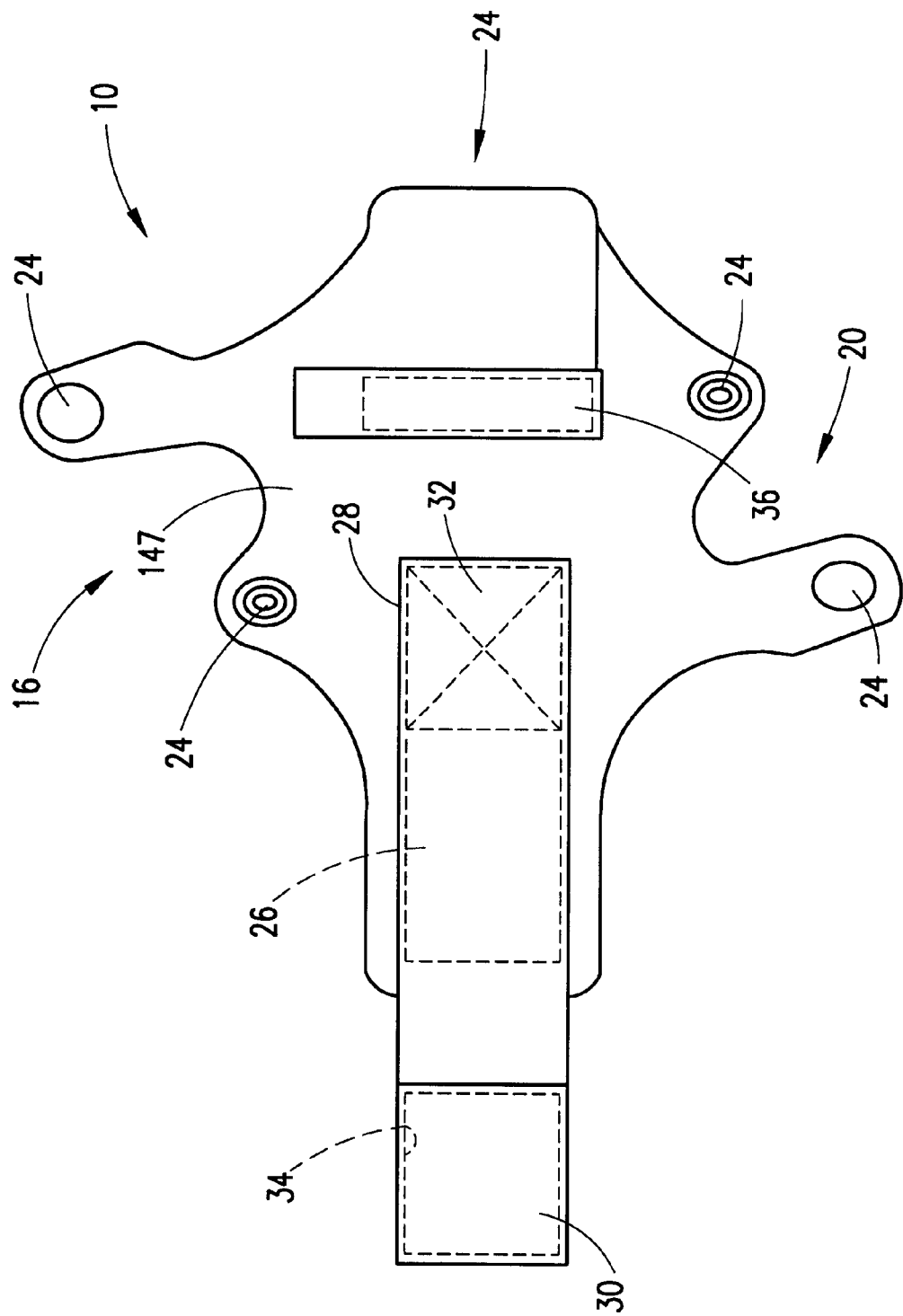
FIG. 4 is a plan view of the case for a mobile terminal, embodying the present invention, showing the case in its flat, unfolded position.

In the preferred embodiment, the mid-portion strap 26 has a first end 28 secured to the mid-portion 24 of the case 10, such as by stitching or adhesives as best seen in FIG. 4, and a second end 30 that extends outwardly from the first end 28. Desirably, the first end 28 has one component 32 of a complementary hook and loop-type fastener securely attached to the outer surface of the first end 28, and the second end 30 of the mid-portion strap 26 has the mating component 34 of the hook and loop-type fastener securely attached to the underneath side of the second end 30. Thus, a mobile terminal 12 is enclosed by the flexible case 10 in response to folding the sheet 14, closing the bottom portion 20 by securing the fasteners 24 together that are disposed in the bottom portion 20, closing the top portion 16 in response to fastening the fasteners 24 disposed in the top portion 16, and then wrapping the mid-portion strap 26 around the mobile terminal 12. The flexible case 10, in its assembled, or folded, state, is illustrated in FIGS. 1–3. The complementary hook and loop-type fasteners 32, 34 respectively disposed on the first end 28 and second end 30 of the mid-portion strap 26, permit a significant variation in the girth size, i.e., the circumferential distance around the case 10 to accommodate differently-sized mobile terminals 12. Other types of fasteners may also be used to provide selectively adjustable closure of the mid-portion strap 26. For example, a tongue and buckle-type fastener, a snap with a plurality of differently-positioned receiving snaps, or a button with a plurality of buttonholes, could summarily be used to provide for the selectively adjustable length closure of the mid-portion strap 26. In addition, the mid portion 24 of the flexible sheet 14 could have an extended portion projecting to the left, as viewed in FIG. 4, which would wrap around and be securable to another area of the mid-portion 24 in a similar manner as that of this mid-portion strap 26.

The sheet of flexible material 14 is desirably formed of a high density neoprene material. Alternatively, the flexible sheet 14 could be formed of leather or a textile fabric material. When the mid-portion strap 26 is initially formed as a separate component of the flexible sheet 14, it may be formed of a different material than that of the main portion of the flexible sheet 14. For example, the mid-portion strap 26 may be formed of polyester or similar flexible plastic.

Additionally, if so desired, a strap 36 may be attached to the mid-portion 24 of the case 10 in a vertical position, as shown in the drawings, to provide a convenient carrying loop, such as for engagement by a belt or external strap.

Figure 5:
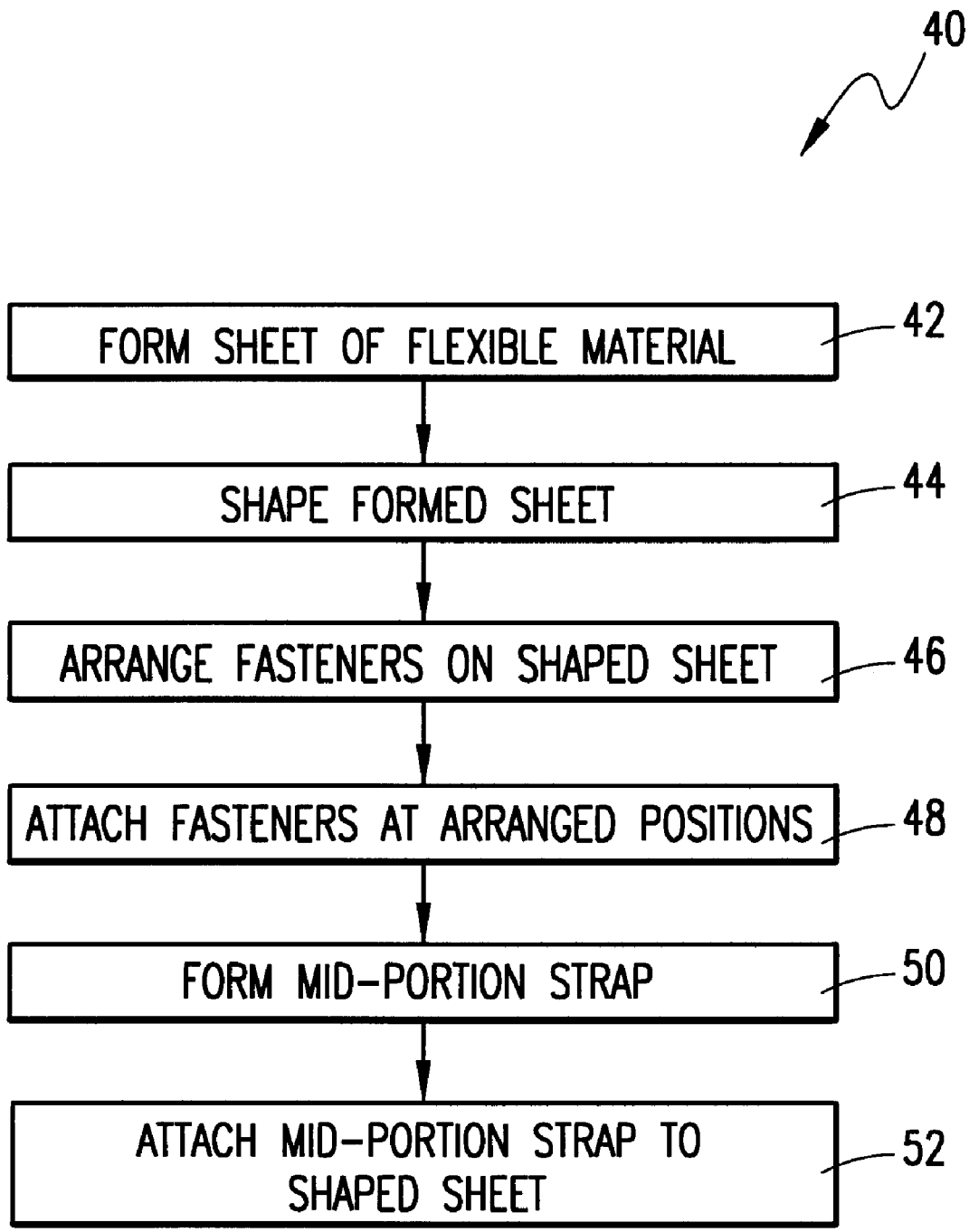
FIG. 5 is a flow diagram illustrating a method of fabricating a case for a mobile terminal, in accordance with the present invention.

In accordance with another aspect of the present invention, a method 40 of fabricating a case for a mobile terminal is illustrated by the flow diagram of FIG. 5. The method 40 of fabricating the case 10 includes forming a sheet of flexible material, such as the aforementioned neoprene, other plastic material, leather, or textile fabric material, as indicated at block 42 and then shaping the sheet of flexible material to a predetermined parametric shape, as illustrated in FIG. 4, and as indicated at block 44. The shaping may be carried out by any one of several conventional methods, such as stamping, laser cutting, or mechanical cutting.

After the flexible sheet 14 is shaped, as indicated at block 44, a plurality of fasteners 24 are arranged, as indicated at block 46 and at preselected positions as illustrated in FIG. 4 at the top portion 16 and bottom portion 20 of the case 10. As described above, the fasteners may comprise either press-type fasteners, complemental hook and loop-type fasteners, or button-type fasteners or the like. Thus, the fasteners 24 are arranged such that at least one of the plurality of fasteners 24 fastens to a second one of the plurality of fasteners 24 so that the sheet of flexible material 14 is thereby adapted to enclose at least a portion of the mobile terminal 12. After arranging the fasteners 24 at the preselected positions, they are mechanically or adhesively attached, as indicated at block 48 to the flexible sheet 14 at the predetermined positions.

Optionally, as indicated at block 50, if the mid-portion strap 26 is initially formed as a separate component, it is fabricated, as described above, with the fasteners appropriately attached to opposite ends 28, 30, and attached to the mid-portion 24 of the case 10 as indicated at block 52.

Thus, it can be seen that the present invention provides a flexible, open-cornered case 10 which, when folded, has a closeable top portion 16, a bottom portion 20, and a mid-portion 24 for protectively enclosing a mobile terminal 12, such as a wireless phone. The mid-portion 24 has a length that is selectively variable, whereby the case 10 can accommodate a variety of differently-sized mobile terminals 12. Moreover, the present invention provides a case 10 that does not require the use of elastic materials integrated into the case construction, and yet is fully adjustable and flexible so that the case 10 can accommodate a wide variety of different-sized instruments 12. Also, the case 10 embodying the present invention can advantageously be unfolded to a flat condition for compact storage when not used to enclose a mobile terminal 12.

Although the present invention is described in terms of a preferred exemplary embodiment, with an illustrative shape for the flexible-sheet 14, and illustrative types of fasteners 24, those skilled in the art will recognize that changes in the specific application-based illustrated shape and in the suggested fastener types may be made without departing from the spirit of the invention. Such changes are intended to fall within the scope of the following claims. Other aspects, features, and advantages of the present invention may be obtained from a study of this disclosure and the drawings, along with the appended claims.

I claim:

1. A case for a mobile terminal, comprising:

a sheet of flexible material;

a first pair of mating fasteners attached to said sheet, said first pair of mating fasteners including a first top fastener and a first bottom fastener, said first bottom fastener and said sheet of flexible material defining a first bottom open-corner and a second bottom open-corner;

a second pair of mating fasteners attached to said sheet, said second pair of mating fasteners including a second top fastener and a second bottom fastener, said second top fastener and said sheet of flexible material defining a first top open-corner and a second top open-corner;

wherein at least one of said first top open-corner and said second top open-corner are defined by an open area in a sidewall and by an open area in a top surface of the case, and at least one of said first bottom open-corner and said second bottom open-corner is defined by an open area in a sidewall and by an open area in a bottom surface of the case;

wherein said first bottom fastener is located proximate a bottom portion, said bottom portion sized to bend across a first end of said mobile terminal;

wherein said second top fastener is located proximate a top portion, said top portion sized to bend across a second end of said mobile terminal; and a mid portion sized to extend at least partially around a mid section of a mobile terminal, said mid portion having an adjustable fastener for accommodating mobile terminals of various sizes.

2. The case, as set forth in claim 1, wherein said sheet of flexible material comprises a single sheet of material.

3. The case, as set forth in claim 1, wherein said sheet of flexible material comprises a plurality of sheet sections attached together.

4. The case, as set forth in claim 1, wherein said sheet of flexible material comprises a substantially flat sheet of flexible material.

5. The case, as set forth in claim 1, wherein said sheet of flexible material comprises a high density neoprene material.

6. The case, as set forth in claim 1, wherein said sheet of flexible material comprises a leather material.

7. The case, as set forth in claim 1, wherein said sheet of flexible material comprises a textile fabric material.

8. The case, as set forth in claim 1, wherein said first pair of mating fasteners and said second pair of mating fasteners comprise complemental press-type fasteners.

9. The case, as set forth in claim 1, wherein said first pair of mating fasteners and said second pair of mating fasteners comprise complemental hook and loop-type fasteners.

10. The case, as set forth in claim 1, wherein said first pair of mating fasteners and said second pair of mating fasteners comprise button-type fasteners.

11. The case, as set forth in claim 1, wherein said sheet of flexible material is foldable to substantially conform to an external surface of the mobile terminal.

12. The case, as set forth in claim 1, wherein said mobile terminal comprises a wireless phone.

13. The case, as set forth in claim 1, wherein said case includes a flexible strap having a first side of a first end attached to said sheet of flexible material and a second end adapted to be attached to a second side of said first end of the strap.

14. A method of fabricating a case for a mobile terminal, comprising the steps of:

forming a sheet of flexible material to a predetermined parametric shape having a bottom portion sized to bend across a first end of said mobile terminal and a top portion sized to bend across a second end of said mobile terminal;

attaching a first pair of mating fasteners to said sheet of flexible material, said first pair of mating fasteners including a first top fastener and a first bottom fastener, said first bottom fastener attached to said bottom portion;

attaching a second pair of mating fasteners to said sheet of flexible material, said second pair of mating fasteners including a second top fastener and a second bottom fastener, said second top fastener attached to said top portion;

arranging at least one of said pairs of fasteners to fasten together such that said sheet of flexible material is thereby adapted to enclose at least a portion of said mobile terminal;

forming at least one bottom open-corner by attaching said first pair of mating fasteners; and forming at least one top open-corner by attaching said second pair of mating fasteners.

15. The method for fabricating a case, as set forth in claim 14, wherein said method includes:

forming an elongated strap;

attaching at least one fastener component at a position adjacent an end of the elongated strap; and attaching said elongated strap to a mid-portion of said flexible sheet.

16. A case for a mobile terminal, comprising:

a sheet of flexible material;

means for fastening a bottom portion of said sheet across a first end of said mobile terminal, wherein said first bottom fastener and said sheet of flexible material define a first bottom open-corner and a second bottom open-corner;

means for fastening a top portion of said sheet across a second end of said mobile terminal, wherein said second top fastener and said sheet of flexible material defining a first top open-corner and a second top open-corner;

wherein at least one of said first top open-corner and said second top open-corner are defined by an open area in a sidewall and in a top surface of the case, and at least one of said first bottom open-corner and said second bottom open-corner is defined by an open area in a sidewall and a bottom surface of the case; and means for adjustably securing a mid section of said mobile terminal.

* * * * *